United States Patent Office 2,932,601
Patented Apr. 12, 1960

2,932,601

PROCESS OF PREPARING FELTED PRODUCTS CONTAINING HYDRATABLE AND NON-HYDRATABLE FIBERS

Don M. Hawley, Geneva, and John C. Williams, St. Charles, Ill., assignors to Hawley Products Company, St. Charles, Ill., a corporation of Delaware No Drawing. Application November 12, 1954
Serial No. 468,563

21 Claims. (Cl. 162—145)

This invention relates to a process for preparing felted products containing hydratable and non-hydratable fibers, more particularly articles containing both glass filaments and cellulose fibers. The invention also relates to a new and improved method of producing novel decorative effects in such articles.

The present application is a continuation-in-part of our copending applications Serial Nos. 189,040, filed October 7, 1950, now matured into U.S. Patent 2,702,241, 267,018, filed January 17, 1952, now matured into U.S. Patent 2,698,558, and 310,373, filed September 18, 1952.

In making fibrous preforms containing non-hydratable fibers such as glass filaments by first dispersing them in water containing dispersed hydratable fibers such as cellulose to form an aqueous slurry before felting the fibers from said slurry into the preform, one of the problems is to prevent the fibers from forming a cottony unmanageable mass. In our copending applications Serial Nos. 189,040, filed October 7, 1950, and 267,018, filed January 17, 1952, which have matured into U.S. Patents 2,702,241 and 2,698,558, respectively, we have disclosed methods of solving this problem by coating bundles of glass filaments with resins such as polyester resins in sufficient amount to keep the bundles from completely disintegrating into individual filaments.

Another problem which arises is the difficulty in maintaining the integrity and strength of the felted fibrous article so that it can be removed from the felting apparatus on which it was originally formed and further so that it will withstand the stress of subsequent impregnation with a fusible resin and molding. The problem is especially difficult in making contoured preforms. The methods which we have heretofore employed have made it possible to prepare fibrous preforms containing glass filaments and to impregnate such preforms with a resin and subsequently mold the impregnated preforms. At the same time there is room for improvement in the wet and dry strength characteristics of such preforms.

In making preforms from aqueous slurries containing cut bundles of glass filaments dispersed in cellulose, we customarily employ glass rovings containing a thin surface coating of polyvinyl acetate and a Werner complex such as that described in Steinman, U.S. 2,611,718, or other treatment which causes a polyester resin preferentially to adhere to the glass roving. We have observed that the cellulose and other hydratable fibers do not take the polyester resin which we employ to coat the bundles of glass filaments in order to maintain their integrity in an aqueous slurry. This results in the lack of bonding strength between the cellulose fibers and the coated bundles of glass filaments. It also sometimes results in the formation of starved spots in the final article after impregnation of the preform with the resin and molding.

One of the objects of the present invention is to provide a new and improved method for forming felted articles of the type described having improved wet and dry strength.

Another object of the invention is to provide new and improved preforms containing hydratable fibers and cut bundles of glass filaments individually coated with a water insoluble coating material characterized by the fact that when said preforms are impregnated with a fusible resin and molded substantial formation of starved spots does not occur.

An additional object of the invention is to provide a new and improved process for producing decorative products containing glass filaments.

A further specific object is to produce new and improved felted articles containing cut bundles of glass filaments which are either clear (i.e., transparent), white or colored and hydratable fibers which are white or colored or have substantially their natural color. Other objects will appear hereinafter.

In accomplishing these objects in accordance with the broader aspects of the invention, hydratable fibers and cut thread-like bundles of non-hydratable fibers are mixed in water to form an aqueous slurry. The non-hydratable fibers in said slurry are preferably present in the form of cut thread-like bundles of strands, each strand being composed of a plurality of glass filaments. The non-hydratable fiber bundles are coated individually with an adherent water insoluble coating material which does not deposit on or adhere to the hydratable fibers. This can be accomplished either by precoating as disclosed in our copending application Serial No. 189,040, now Patent No. 2,702,241, or by coating the bundles of glass filaments in the aqueous slurry as disclosed in our copending application Serial No. 267,018, now Patent No. 2,698,558. In accordance with the present invention a binding agent is added to the slurry capable of binding said hydratable fibers and coated bundles of non-hydratable filaments together when an article is felted from the slurry. The binding agent preferably employed for the purpose of the invention is a polyester resin in its fusible state. After the addition of the binding agent, the desired article is felted from the slurry.

An important feature of the invention is the addition to the aqueous slurry of a substance which causes the binding agent to wet and adhere to the hydratable fibers. This agent is preferably a compound which has an affinity for the resin and the hydratable fibers. Ordinary anionic wetting or emulsifying agents may be employed in dispersing the binding agent. However, an excess of such agents would tend to wash the binding agent off of the fibers. Also, it has been found that with anionic agents alone, if the deposition does take place, it may be on the glass only. To make the agent deposit on hydratable fibers, such as cellulose, requires a cationic agent or a mordanting agent.

The preferred way of practicing the invention comprises mixing water-wettable hydratable fibers and cut bundles of non-hydratable fibers in water to form an aqueous slurry, contemporaneously adding a fusible polyester resin capable of being cured to an infusible state and capable of forming an adherent coating on the bundles of the non-hydratable fibers, curing said resin to a substantially infusible state in said aqueous slurry, thereafter adding to said slurry a substance which will cause a fusible resin to preferentially wet and adhere to the hydratable fibers, thereafter adding an additional quantity of the last mentioned fusible resin, and felting a product from the resultant mixture.

The invention is preferably carried out by using cut thread-like bundles of glass filaments as the non-hydratable fiber and cellulose as the hydratable fiber. Glass rovings which are available commercially can be employed in the practice of the invention. In such rovings the glass filaments are approximately .00038" in diameter. About 204 of such filaments are collected in a bundle or strand and a roving consists of about 60 such strands. For the purpose of the invention such bundles or rovings are preferably cut into lengths of approximately ⅛ inch to 6 inches. The strands normally contain a binding agent which holds the filaments together and starch sizings are sometimes used for this purpose. For the purpose of the present invention, however, it is preferable that the strands be coated with a substance which increases their affinity for the resin to be added thereto, as, for example, stearato chromyl chloride, vinyl trichlorosilane and materials of the type disclosed in U.S. Patents 2,273,040, 2,359,858, 2,381,752, 2,401,645, 2,552,910 and 2,611,718.

The water-wettable fibers which can be employed in the practice of the invention are, for example, envelope clippings, refined rag. kraft, cotton linters, caroa, and other cellulose fibers; fine glass fibers such as AA and AAA glass fibers and other glass fibers having a diameter from about 0.00006 inch to 0.0001 inch.

The resins which are employed to coat the bundles of glass filaments are preferably of the thermosetting type and include resins such as those disclosed in U.S. Patents Nos. 2,318,959, 2,373,067, 2,381,969, 2,385,911, 2,397,240 and 2,401,549. The preferred resins are thermosetting resins in which ester groups are an integral part of the main chain or cross-linking chains, as, for example, resins prepared by reacting two mols of ethylene glycol with one mol of phthalic anhydride and one mol of maleic anhydride for two to four hours at a temperature of 160° C. in an inert atmosphere such as nitrogen, carbon dioxide or illuminating gas, and then adding to the resultant product 10% to 40% monomeric styrene. Resins of the last mentioned type are usually referred to as polyester resins and, in general, are made by reacting a polyhydric alcohol with a polybasic acid or acid anhydride. Usually at least a portion of the acid component is maleic anhydride. The rigidity or flexibility of the resin can be varied by varying the type of polyalkylene glycol or by adding a portion of the dibasic acid as adipic acid or other higher molecular weight dicarboxy acid. Thus, by using ethylene glycol in the manner just described, a relatively rigid or non-flexible resin is produced. In order to produce flexible thermosetting polyester resins, higher molecular weight polyalkylene glycols, e.g., polyethylene glycol 200, polyethylene glycol 400, polyoxypropylene glycols and mixed polyethylene-polyoxypropylene glycols are substituted for the ethylene glycol or a portion of the dibasic acid used is adipic acid.

Solutions of these resins in monomeric vinyl compounds such as styrene are liquid and usually have an acid number around 10 to 50. When this liquid resin is catalyzed with a curing catalyst, a solid infusible resin is formed. Heating accelerates the formation of the infusible resin.

Suitable catalysts are the organic peroxides which are soluble in the hydrophobe or resin phase, for example, benzoyl peroxide, acetylbenzoyl peroxide, cumene hydroperoxide, paratertiary butyl perbenzoate, methylethylketone peroxide, and other oil soluble oxygen-supplying catalysts.

Examples of other monomeric aryl compounds having an unsaturated side chain which can be employed in place of a part or all of the styrene are: vinyl toluenes, vinyl naphthalenes, vinyl ethyl benzenes, alpha methyl styrene, vinyl chlorobenzenes, vinyl xylenes, divinylbenzene, divinyltoluenes, divinyl naphthalenes, divinyl xylenes, divinyl ethyl benzenes, divinyl chlorobenzenes, divinylphenyl vinyl ethers and diallyl phthalate. Lower boiling monomers such as vinyl acetate usually are not satisfactory because the reaction which takes place when the resin is cured is very exothermic and the heat would drive off low boiling monomers.

Some thermosetting resins are compounded with driers such as lead and cobalt salts of 2-ethyl hexoic acid, oleic acid, naphthenic acids, and other carboxylic acids, and the thermosetting resins used in the practice of the invention can contain such driers. We have also obtained good results by adding the thermosetting resin to the fibers in the aqueous slurry without such driers.

In the practice of the present invention the hydratable fibers are preferably dispersed in water first to serve as a dispersing medium for the subsequently added non-hydratable fibers. The resin which is usually mixed with the catalyst is preferably added to the slurry simultaneously with or shortly after the addition of the non-hydratable bundles of fibers and preferentially coats the latter. The coating of the non-hydratable fibers such as bundles of glass filaments performs several functions. In the first place, without the resin addition, bundles of filaments such as cut glass rovings of commerce, even though they contain a thin film or coating of polyvinyl acetate or other substance adapted to increase the adherence of the resin for the glass, nevertheless, readily come apart in water and soon form a cottony unmanageable mass. The quantity of the resin added in the first addition should preferably be sufficient to hold the bundles of filaments together, and in the case of bundles of glass filaments, usually at least about 5% by weight of the resin based on the dry weight of the bundles of glass filaments is required. Another function of the first resin addition is to stiffen the bundles of glass filaments so that no wrinkles are formed when the felted article is subsequently impregnated with a resin and molded. Usually the addition of about 10% by weight of a polyester resin based on the dry weight of the glass filaments will produce an optimum amount of stiffness to prevent wrinkling of the filaments in the subsequent molding operation. In general, the quantity of resin added in the first addition will be within the range of 5% to 25% by weight, based on the dry weight of the cut bundles of glass filaments or other non-hydratable filaments.

The second resin addition is preferably weakly catalyzed and is not cured until the article is felted and dried. This second addition functions as a binder for the felted article and makes is possible to produce much stronger preforms. This is especially desirable where the preform is contoured and it is desired to retain the preform shape approximately corresponding to the shape of the finished molded article. The resins used in the second addition can be the same as those employed in the first addition but in many cases it is desirable to use different resins in the second addition in order to obtain different properties in the final product. The resin employed in the second addition can also be a thermoplastic resin rather than a thermosetting resin. In the use of polyester resins for the second addition, the ordinary types give a rather sticky stock and a high viscosity or solid resin is preferably employed. These resins can be added in solutions of solvents such as methylethylketone in order to increase the ease of addition. They can also contain loading agents such as clay in order to render them less sticky.

According to a preferred method of practicing the invention, prior to the second addition of resin, a substance is added which causes the resin to wet the hydratable fibers. This can be accomplished by adding a water dispersible cationic substance or a mordanting agent. Examples of cationic substances especially useful for the purpose of the invention are cationic melamine formaldehyde, cationic urea formaldehyde, lauryl pyridinium chloride and cocoamine acetate. Alum is an example of a mordanting agent suitable for the purpose of the invention.

In producing novel decorative effects, the invention is especially valuable as illustrated by the following procedures in which the aqueous slurry is under continuous agitation:

(1) The hydratable fiber employed is cellulose which is initially uncolored. The non-hydratable fiber employed consists of cut glass filament rovings from ½" to 2" in length. The first resin addition is a clear, fusible, thermosetting polyester resin which coats the cut bundles of glass filaments leaving the cellulose substantially unaffected. Curing the polyester resin in the aqueous slurry fixes it in place on the cut bundles of glass filaments. A cationic substance is then added to the aqueous slurry and a second resin addition is made consisting of a fusible, weakly catalyzed polyester resin containing an oil-dispersed color or pigment. The cationic substance, e.g., cationic melamine formaldehyde, causes the second addition of weakly catalyzed colored polyester resin to wet the cellulose, thereby coloring the cellulose a color different from the clear coating on the cut bundles of glass filaments. A preform is then accreted or felted from the resultant aqueous slurry to produce an article in which the cut bundles of glass filaments, individually coated with the clear polyester resin, are dispersed in cellulose fibers colored with polyester resin. The shape of the preform is approximately the shape of the desired final article. In other words, if the desired final article is contoured, the preform is also contoured. The preform is either dried in an oven or die dried. Die drying is a special process in which the wet preform is placed between heated dies, at least one of which contains openings or passageways to permit the withdrawal of water, steam and the like, during the drying. Die drying has the advantage that a finished article (or strong preform) is obtained directly. It has the disadvantage in some processes involving the use of resins that the resins may clog the drainage of the dies, but the process of the present invention results in a preform which can be died dried. If the preform is oven dried, the resultant preform can then be impregnated with additional quantities of a polyester resin which is preferably clear but can be colored and molded between dies in a suitable press at temperatures and for a period of time sufficiently long to cure the impregnated resin. The weakly catalyzed second stage addition resin is cured during die drying or oven drying. The quantity of the impregnating resin may vary but good results are obtained by employing a weight ratio of approximately ⅓ to 2 parts of resin per part by weight of preform. If polyester resins are employed for impregnation, the temperature in the press may vary, for example, within the range of 220° F. to 270° F. A period of about 2 to 5 minutes at these temperatures is usually sufficient to cure the resin. The pressure can be anywhere from 0 to 2000 pounds per square inch and upwards. In low pressure molding operations, the pressure required to close the press will usually not exceed 200 pounds per square inch. In order to produce a product high in glass fiber and low in resin (e.g., 25% resin), pressures from 1000 to 2000 pounds per square inch, and even higher pressures can be employed. Impregnation of a die dried article with a lacquer, varnish or resin followed by drying in an oven at atmospheric pressure produces a strong tough article.

(2) The process is carried out as in (1) except that the first addition of resin to the aqueous slurry consists of a polyester resin containing a dispersed coloring matter. The second addition of polyester resin to the aqueous slurry contains a different coloring matter and the preform, as well as die dried or molded products made therefrom, are multicolored.

(3) The process is carried out as in (2) except that the color of the first and second addition of resins is the same and a small amount of contrasting separately colored glass fiber is added.

(4) The procedure is the same as in either (1) or (2) except that another cationic substance such as lauryl pyridinium chloride or cocoamine acetate is added to the aqueous slurry to cause the cellulose to take up the resinous binder after the first addition of fusible resin has been substantially cured to its infusible state.

(5) The procedure is the same as in (1) or (2) except that alum is added to the aqueous slurry instead of the cationic melamine formaldehyde. The addition of alum causes the cellulose to take up the subsequently added resin.

(6) The procedure is the same as in (3), (4) or (5) except that in the second addition of the polyester resin a clear resin is used and a pigment is added separately to the aqueous slurry.

(7) The procedure is the same as that described in (1) to (6) except that polyvinyl acetate and corn starch are added as the second resin addition.

The fusible resin which is added to the fiber during the wet processing should preferably have a viscosity within the range of 100 centipoises to 20,000 centipoises. However, resins having a greater viscosity or even solid resins can be used by diluting them with a solvent such as acetone or methylethylketone. Very low viscosity resins can also be employed by heating the aqueous slurry to thicken the resins in situ. Heat can sometimes be used to thin high viscosity resins. Where a pigment is mixed with the resin we prefer to add it as a polyester pigment paste. Polyester pigment pastes usually contain 20% to 50% by weight pigment in polyester resin. We prefer to use about 1 part of pigment paste to 2 to 5 parts of resin. Hence, the pigment is about 2% to 25% by weight of the resin added in any given stage. The polyester containing a pigment can also be thinned with methylethylketone or acetone. The second resin addition can also be cured to a substantially infusible state in the aqueous slurry, and this has the advantage that it tends to drive the water out of the cellulose or other hydratable fiber, thereby decreasing the subsequent drying time. In ordinary practice, however, since a subsequent drying step is desirable, the second addition of resin, if of the type which can be cured to an infusible state, is cured in the subsequent drying step, that is, after the fibers have been felted into an article and the felted article has been removed from the aqueous slurry.

The invention will be further illustrated but is not limited by the following examples in which the quantities are stated in parts by weight unless otherwise indicated.

*Example I*

Open 8 pounds of white kraft fiber at 120° F. in 300 gallons of water using a disc stirrer or other suitable mixing apparatus to a Williams freeness around 5 to 6 seconds. Add 50 pounds of cut glass filament rovings consisting of 25 pounds 1¼" cut rovings and 25 pounds ½" cut rovings. The cut rovings are Fiberglas of the type used for plastic molding which has a chromium complex, polyvinyl acetate surface treatment. At the same time add a resin made by mixing together 5½ pounds rigid polyester resin (IC–625), 2 pounds turquoise pigment ground in polyester (Glidden Turquoise), 60 grams of a composition consisting of 50% by weight benzoyl peroxide and 50% by weight tricresylphosphate (Luperco ATC), 30 grams cobalt dryer, consisting of cobalt naphthenate containing 6% by weight Co, 30 grams of a composition consisting of 50% by weight methylethylketone peroxide and 50% by weight dibutyl phthalate (Lupersol DDM) and 2 pounds methylethylketone.

Stir the mixture of cellulose, resin and cut rovings and heat to 180° F. Continue the heating until the resin has cured on the cut rovings which requires about 15 to 20 minutes.

Add to the resultant batch 1½ gallons of a 10% aqueous hydrochloric acid solution of cationic melamine formaldehyde (Parez 607). This can be prepared in a standard 55 gallon drum by adding 16 inches of water heated to 120° F., then adding 2½ gallons of concentrated hydrochloric acid, thereafter adding 40 pounds of melamine formaldehyde resin (e.g., Parez 607) while mixing and finally filling the drum with water.

Add to the resultant batch a composition consisting of ¾ pound of turquoise pigment ground in polyester, 1.5 pounds of uncured, non-sticky, practically solid, high viscosity polyester (Vibrin 1055B), 1.5 pounds of liquid polyester of the impregnating type (Interchemical 625) and 18 grams of Luperco ATC.

Dilute the resultant batch with water to a felting consistency within the range of ¼% to 6% by weight of the total fibers, preferably around ¼% to ½% by weight of the total fibers, based on the weight of the water. This dilution reduces the temperature to around say 150° F.

Separately prepare the following composition: Open 9 pounds (on a dry basis) of wet lap rag in a laboratory breaker in 250 gallons of water at 150° F. to a Williams freeness of around 5 to 6 seconds. Add 36 pounds of fiber glass rovings cut to ½" lengths and continue opening in the breaker for 15 seconds. Then add a resinous composition consisting of 800 grams of titanium dioxide pigment polyester paste (Interchemical high hiding white), 1350 grams polyester resin (Interchemical No. 625), 50 grams Luperco ATC, 20 grams cobalt naphthenate containing 6% Co, 300 grams methylethylketone and 40 grams Lupersol DDM. Continue agitating the resultant mixture in the breaker for 30 seconds, heat to 200° F. and continue at this temperature for 20 minutes. Add ¼ of the resultant composition to the previously described batch and immediately felt the fibrous mixture by accretion on to a porous former having a contoured shape, as, for example, the shape of a chair body.

Dry the resultant preform in a circulating air dryer oven. A chair body perform having a wet weight of around 4 pounds will have a dry weight around 2 pounds.

Add to the preform 2½ pounds for every 2 pounds of dry weight catalyzed clear polyester resin (Interchemical 625, Rohm & Haas P-47, Laminac 4123 or Selectron 5003), and mold the resultant impregnated resin in a press at a temperature of 220° F. and 100 pounds per square inch pressure on the piece for 4 to 5 minutes.

The finished product is a two-toned product in which cut bundles of glass fibers 1¼ inches long and ½ inch long are colored turquoise, the cellulose is colored turquoise and bundles of glass fibers ½ inch long are colored white. All of the fibers are dispersed in a clear resin giving a very unusual and delicate shading effect.

*Example II*

The procedure is the same as that described in Example I except that the chair body has a sandlewood color. This is accomplished by preparing the first addition resin with 2¼ pounds of titanium dioxide pigment ground in polyester (Interchemical high hiding white) instead of the 2 pounds of turquoise pigment. The second resin addition is made with 1½ pounds of titanium dioxide pigment (Interchemical high hiding white) instead of the ¾ pound turquoise pigment. The final addition made after dilution of the stock is prepared as described in Example I except that 900 grams of a light brown pigment is substituted for the titanium dioxide pigment (Interchemical 324 light brown) and only ⅐ of the resultant composition is used instead of the ¼ employed in Example I.

Except for the differences previously mentioned, the preform is made and impregnated as described in Example I. The finished molded product is a two-toned product and the cut bundles of glass fibers 1¼" long and ½" long are colored white. The cellulose is also colored white and bundles of glass fibers ½" long dispersed throughout the product are colored a light brown. In this way, a two-toned color effect is obtained with light brown on a white background dispersed in a transparent resin.

*Example III*

The procedure is the same as that described in Example I except that the first addition resin is prepared by substituting 2 pounds of a black pigment (Laminac black) for the turquoise pigment. 20 grams of the cobalt dryer are also substituted for the 30 grams of the cobalt dryer used in Example I.

The second resin addition composition is prepared by emulsifying 2 pounds of high viscosity polyester (Vibrin 1055B), 2 pounds impregnating type polyester resin (Interchemical 625), ½ pound black pigment paste (Laminac black paste) and 2 pounds methylethylketone in 7 pounds of water containing 1 pound of 5% by weight methyl cellulose (4000 centipoises Methocel).

The final addition of ½ inch water dispersed Fiberglas cut rovings coated with polyester resin and white pigmented is prepared as in Example I except that only ⅛ of the resultant batch is added to the diluted previously prepared fiber suspension instead of the ¼ used in Example I.

A molded chair body made as described in Example I with the exceptions noted above consists of bundles of glass fibers 1¼" long and ½" long colored black, intermingled with cellulose fibers also colored black, and cut bundles of glass fibers ½" long colored white, all dispersed in a transparent resin. A novel and very unusual decorative effect is obtained.

*Example IV*

The procedure is the same as that in Example I except that 7 pounds of white kraft are used instead of the 8 pounds employed in Example I.

The first resin addition is prepared in the same way as that described in Example I except that 2 pounds of a white titanium dioxide pigment ground in polyester (Laminac white) are employed instead of the turquoise pigment.

In the second addition ¾ pound of white pigment is employed instead of the turquoise pigment. 4 pounds of the high viscosity polyester (Vibrin 1055B) are employed instead of the 3 pounds used in Example I, and 12 grams of Luperco ATC are employed instead of the 18 grams employed in Example I.

The final addition of pigmented resin-coated ½" Fiberglas rovings is prepared in the same manner as described in Example I except that 675 grams of black pigment (Ferro Corporation black paste) are used instead of the 800 grams of titanium dioxide pigment in Example I and only 1/12 of the resultant batch is employed instead of the ¼ used in Example I.

The resultant molded chair body may be described generally as an Oxford grey and an unusual two-toned decorative effect is obtained because ½" glass rovings and 1¼" glass rovings are colored white and intermingled with cellulose fibers, also colored white, and ½" glass rovings colored black, all dispersed in a transparent resin.

*Example V*

The following example is given to illustrate the practice of the invention in making a sheet material and also in producing decorative effects in such a material.

50 parts by weight (on a dry basis) of bleached kraft pulp are opened in a large volume of water at 120° F. To the resultant dispersion there is added 5 parts by weight of a clear polyester resin (Laminac 4123) catalyzed with 2% by weight Luperco ATC, 1% by weight cobalt naphthenate containing 6% Co, and 1% Lupersol DDM and colored with an oil-dispersed green pigment.

50 parts by weight of ½" to ⅞" cut Fiberglas rovings surface treated with a chrome complex-polyvinyl acetate finish are added to the resultant mixture. The polyester resin coats the glass fiber rovings, leaving the cellulose substantially unaffected. The resultant mixture is heated to 160° F. and maintained at this temperature until the resin is changed from a fusible to an infusible state.

11 parts of a solution of cationic melamine formaldehyde prepared as described in Example I is then added, followed by the addition of 5 parts by weight of uncatalyzed polyester resin (Laminac 4123), and 10 parts of 50% by weight polyvinyl acetate emulsion (Carbide and Carbon WC–130).

The fiber suspension is diluted with water to a consistency of 0.2% by weight of fibers and the stock is felted on an Oliver board-forming machine to produce flat sheets which are dried flat in a gas-fired oven at 250° C.

The resultant sheets in which the fiber content is approximately 50% cellulose and 50% glass are suitable for use as such and can also be impregnated with polyester molding resins and molded to produce molded products having excellent physical characteristics.

*Example VI*

This example is given to illustrate the employment of the invention in the preparation of a contoured, die dried article.

A dispersion is prepared by opening 100 pounds northern kraft, 23 pounds envelope clippings, 29 pounds defiberized rag and 10 pounds shredded wood in 250 gallons of water at 120° F. to a Williams freeness of about 6 seconds.

A polyester resin is separately prepared by mixing ½ gallon of a commercial polyester resin (Interchemical 625) with 1% by weight of Lupersol DDM and ½% cobalt drier. The resin composition is then added to the cellulose dispersion, and, at the same time or shortly thereafter, 18 pounds of 2" Fiberglas cut rovings are added. The mixture is agitated in a breaker for 1 minute and heated to a temperature of 160° F. until the fusible polyester resin is substantially converted into an infusible resin.

There are then added to the resultant dispersion 4¾ gallons of the cationic melamine formaldehyde material described in Example I, 40 pounds of polyvinyl acetate, 7 pounds of corn starch and 1 quart of a 50% emulsion of petroleum wax (Alwax). The resultant mixture is felted on a contoured former to approximately the shape of a typewriter carrying case and the felted preform is die dried between heated foraminous dies at a temperature of approximately 450° F. and a pressure of 50 pounds per square inch for 3 minutes. A finished piece is obtained which is suitable for covering with cloth or other similar type of material. In a similar manner shells for luggage can be made.

It will be noted that this example also illustrates the use of a thermoplastic resin, namely polyvinyl acetate, as the second addition resin. Thermoplastic resins of this type are characterized by the fact that the ester groups are in side chains rather than the principal resin chain. The starch, although not a resin, is a substantially water insoluble material which improves the surface finish of the resultant product and its ability to receive an adhesive for the application of a covering material.

*Example VII*

This example is given to illustrate the employment of different types of substances to cause the hydratable fibers to take a polyester resin. The example also illustrates the results obtained when no such substance is added.

10 grams of refined rag are opened in 2 gallons of water at 120° F. to produce a dispersion having a Williams freeness around 6 seconds. To this is added simultaneously while mixing 40 grams ½" cut Fiberglas rovings of the type used for plastic molding which has a chrome complex polyvinyl acetate surface treatment and a resin mixture consisting of 5 grams of polyester resin (Interchemical 625), and 1 grams of polyester paste color catalyzed with 2% by weight Luperco ATC, ½% cobalt dryer of the type described in Example I and 1% Lupersol DDM.

The resultant slurry is heated to 180° F. while mixing and the resin is observed to go on the glass. The resin is cured in 15 or 20 minutes at this temperature and the glass fibers are colored, wire-like and substantially rigid.

The slurry is now chilled to 140° F. and a substance having the property of causing a polyester resin to adhere to the cellulose is added. Following this, a solution of resin is added which is prepared by mixing the following ingredients; 2 grams polyester (Interchemical 625), 2 grams high viscosity polyester (Vibrin 1055B), 2 grams orange polyester paste, 3 grams methylethylketone, 0.12 gram Luperco ATC. The mixture is stirred during the addition of the last mentioned resinous composition.

When no substance is added to alter the resin adherence characteristics of the cellulose, the second resin addition goes into droplets and collected on the side of the vessel or is interspersed in the stock as large droplets.

When 10 grams of a 10% solution in alum is added prior to the second addition of the resin, smooth deposition of the second resin addition occurs on all of the fibers.

When 10 grams of a 10% cationic melamine formaldehyde solution in hydrochloric acid is added, smooth deposition of the second resin addition occurs on all of the fibers.

When 1 gram of cocoamine acetate (Armac CD) is added, smooth deposition of the second resin addition occurs on all of the fibers.

When ½ gram of lauryl pyridinium chloride is added prior to the second resin addition, smooth deposition occurs on all of the fibers.

Test pads made by felting the fibers into a pad and drying are found to be strongly bound and can readily be impregnated with a polyester resin and molded to produce smooth molded products without splitting in the case where substances such as alum, cationic melamine formaldehyde, cocoamine acetate or lauryl pyridinium chloride are added to the dispersion prior to the second resin addition. Where no such substances are added, the fibers are poorly bound, the clear molding resin does not impregnate the pad uniformly and starved spots are apt to occur in the final molding.

*Example VIII*

Example VII is repeated up to the point of curing the first resin addition on the bundles of glass filaments. Then 10 grams of a 10% solution of a cationic melamine formaldehyde resin (prepared as described in Example I) are added, followed by 5 grams of a polyvinyl acetate emulsion (Carbide and Carbon WC–130) containing 50% solids. A pad felted from the resultant dispersion is found to have the fibers well bonded together and molds well when impregnated with a polyester resin and subjected to heat and pressure between solid molding dies.

*Example IX*

20 grams of AAA glass (a fine untreated water dispersible variety) when substituted for the cellulose in Example VII behaves similarly to the cellulose.

*Example X*

One pound ½" cut Fiberglas roving is precoated with ½ pound 25% by weight polyester resin catalyzed with 2% by weight of the resin of Luperco ATC dissolved in methylethylketone. This is picked apart into a fluffy mass, the solvent removed by blowing air through the mass at 120° F. and the resin cured by baking at 300° F. for 15 minutes. It is found that on agitation in water the strands will separate from the roving, but the filaments do not come apart from the strand under the usual agitation.

The precoated bundles of filaments prepared as above described are agitated in water with 1 pound beaten white kraft fiber, the temperature brought to 120° F. and 90 cc. of 10% by weight melamine wet strength resin solution of Example I added. Agitation is continued while a solution (A) having the composition 100 grams clear polyester resin (Interchemical 625)
50 grams pigmented polyester resin (Interchemical high hiding white)
12 grams catalyst (Luperco ATC)
100 grams methylethylketone
20 grams finely divided silicon dioxide (Santocel) mixed with 100 grams of methylethylketone is added.

The mixture disperses easily under agitation.

Tray preforms are felted from the resultant mixture, dried and impregnated with 2½ pounds of catalyzed clear polyester resin (Interchemical 625, Rohm & Haas P–47, Laminac 4123 or Selectron 5003) for every 2 pounds (dry weight) of the preform. The impregnated preform is then molded in a press at a temperature of 200° F. and 100 pounds per square inch pressure exerted on the preform for 4 to 5 minutes.

This example illustrates the practice of the invention where the bundles of glass filaments are first precoated with a resin to prevent them from completely disintegrating into individual filaments in an aqueous slurry, then slurrying the precoated bundles in water, followed by the addition of a cationic agent and a fusible polyester resin binding agent.

Example XI 40 parts of refined rag and 10 parts of ½" cut Fiberglas roving pretreated with a Werner complex and polyvinyl acetate are opened in water at 2% consistency (2 parts of fiber per 100 parts of slurry) under good agitation for 20 minutes.

A resin composition is prepared by mixing 2.5 parts of a polyester resin (Interchemical 625 colored red) in 2.5 parts of methylethylketone with 2% by weight of the resin of a catalyst (Luperco ATC) and adding the mixture to the previously prepared slurry. After 2 minutes of mixing under agitation, 10 parts of a 10% aqueous hydrochloric acid solution of cationic melamine formaldehyde (Parez 607) are added to the slurry, followed by an addition of an equal amount of the above described red polyester resin. The first resin addition is observed to go on the glass while the second resin addition appears to be taken up mostly by the cellulose. The resultant mixture is felted into a sheet, dried at 300° F. and is observed to have a good appearance and an excellent strength.

Example XII 30 parts of refined rag and 20 parts of ¼" cut Fiberglas roving pretreated with a Werner complex and polyvinyl acetate are opened under a high speed mixer at 120° F. for 20 minutes in the presence of water at about 2% consistency.

A resin composition consisting of 2.5 parts of clear polyester resin (Interchemical 625), 2.5 parts methylethylketone and 0.5 part red polyester paste, catalyzed with 2% by weight of the resin of Luperco ATC, is added to the previously prepared slurry and after 2 minutes mixing under agitation, 10 parts of a 10% by weight aqueous hydrochloric acid solution of cationic melamine formaldehyde (Parez 607) are added.

Thereafter, a second equal amount of the same polyester resin is added. The first resin addition adheres to the glass while the second resin addition, in a major proportion at least, adheres to the cellulose. This stock is felted into a sheet and dried at 300° F.

Examples XI and XII illustrate the application of the invention in the formation of sheets. These examples also illustrate methods of making a dimensionally stable sheet or mat which is strengthened by the incorporation of resin and glass. The coated bundles of glass filaments in these sheets which are bonded into the cellulose structure act as re-enforcing rods improving tear resistance, reducing water or humidity swelling and increasing burst strength. Decorative effects are obtained by coloring the glass fiber and also by coloring the cellulose with the second resin addition after the addition of the cationic substance.

It will be apparent that some modifications and variations may be made in the practical application of the invention. The quantity of resin employed to preserve the integrity of the bundles of non-hydratable glass filaments can be varied in the manner previously described. The quantity of resin added in the second resin addition is subject to considerable variation but is preferably 1% to 25% by weight of the total fibers dispersed in the aqueous slurry. The total resin added in the first and second additions, therefore, is preferably within the range of 6% to 50% by weight of the total fibers.

The proportions of hydratable fibers and non-hydratable fibers can vary, for example, from 5% to 95% by weight of the hydratable fiber, and from 95% to 5% by weight of the non-hydratable filament bundles. Generally, it is desirable to have the weight ratio of hydratable fiber to non-hydratable fiber within the range of 1:9 to 9:1.

When certain types of resins are employed in the second addition, and particularly if they are added in the form of emulsions, it is not absolutely essential to add a substance which will increase the receptivity of the hydratable fiber to the resin. This is the case, for example, with thermoplastic resins such as polyvinyl acetate, polymethylacrylate, polyethylacrylate, polymethylmethacrylate and polyethylmethacrylate resins. Generally speaking, however, improved results are obtained by adding a substance which enhances the receptivity of the hydratable fiber for the resin.

As previously indicated, there are a large variety of substances which will enhance the receptivity of the hydratable fiber for the resin. The cationic melamine-aldehyde resins are preferably employed for this purpose because they are readily available commercially. The colloidal portion of these materials (i.e., the large portion of the molecule) carry a positive electrical charge when in aqueous solution. They may be prepared by dissolving ordinary melamine-aldehyde condensation products, such as methylol melamines, in acids such as hydrochloric acid, to form acidified or acid-type resin solutions having a glass electrode pH value within the range from about 0.5 to about 3.5 when measured at 15% solids, or pH values up to 4.5 when measured in more dilute solutions, followed by aging to the colloidal condition, as described in U.S. Patent 2,345,543.

The melamine formaldehyde resins are sometimes referred to as aminotriazine-aldehyde condensation products. Other methods of preparing such condensation products suitable for the practice of the invention are disclosed in U.S. Patents 2,485,079, 2,559,220, 2,577,767 and 2,529,856.

Urea-aldehyde resins suitable for the practice of the invention are disclosed in U.S. Patents 2,304,600, 2,456,-191, 2,471,188, 2,476,065, 2,497,074, 2,517,128, 2,554,-475, 2,556,898, 2,557,299, 2,625,524, 2,626,251 and 2,-634,247.

Examples of other amide-aldehyde resins and amine-aldehyde resins which are suitable for the practice of the invention are those disclosed in U.S. Patents 2,497,073, 2,567,238, 2,526,638, 2,540,352, 2,548,513 and 2,567,-238.

As an example of another class of compounds which increase the receptivity of cellulose and other hydratable fibers for resins in the second addition, there may be mentioned the alkyl ammonium acetates having the following general formula

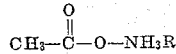

in which R is a hydrocarbon group containing 12 to 18 carbon atoms, for example, dodecyl, tetradecyl, hexadecyl, stearyl, oleyl, and mixtures thereof. These compounds are derived from primary amines, acetic acid and various fatty acids, including coconut fatty acids, hydrogenated tallow fatty acids and soya fatty acids. These substances also generally exhibit very strong cationic substantivity.

In addition to lauryl pyridinium chloride, other pyridinium, quinolinium and quaternary ammonium chlorides can be employed which have a long hydrocarbon chain containing 6 to 18 carbon atoms, including, for example, cetyl pyridinium chloride, stearyl pyridinium chloride, and the like.

The quantity of the substance added to increase the receptivity of the hydratable fiber to the resin can be relatively small and is preferably within the range of about 0.5% to 5% by weight of the hydratable fiber.

The invention has a number of advantages in making felted articles containing both hydratable and non-hydratable fibers. The addition of the resin to the aqueous slurry to bind together the hydratable fibers and resin-coated non-hydratable fibers before an article is felted from the slurry, makes it possible to produce a wet felted article which can be removed from the forming apparatus without tearing the felted article. The hydrated fibers, such as cellulose fibers, in this article are intermingled with and bonded to the resin coating on the bundles of non-hydratable filaments by a resin-to-resin bond. At the same time, the fibers are spaced and are adapted to receive a subsequently applied impregnating resin in the interstices of the fibers. If the resin, which is added to bind the cellulose or other hydratable fibers to the resin-coated bundles of glass filaments, is a fusible thermosetting resin which cures to an infusible form upon heating, the subsequent drying of the felted article will set the resin by converting it to the infusible form. If the product is dried in an oven, the curing will occur while the felted article is in the oven. If the product is subsequently impregnated with a liquid polyester resin and molded between solid molding dies, any curing of the resin which has not occurred in the drying oven will take place under the molding conditions. If the wet felted product is die dried directly by placing it between heated foraminous dies having the shape of the final article, the fusible resin will be converted to an infusible resin during the die drying. It is also possible, as previously explained, to convert a catalyzed fusible thermosetting resin added to the aqueous slurry in the later stages to an infusible form by heating the slurry to a temperature sufficiently high to cure the resin. The use of heat in order to cure a fusible thermosetting resin to an infusible state is not always necessary if a strong enough catalyst is used and sufficient time is allowed for the curing to take place.

It is possible in the practice of the invention to add all of the fusible thermosetting resin contemporaneously with the addition of the cut bundles of glass filaments to the dispersion of cellulose or other hydratable fiber and then, after the resin has partially coated the bundles of glass filaments to keep them from falling apart in the slurry, a substance such as cationic melamine formaldehyde can be added to cause a part of the resin to wet the cellulose. This is a rather difficult procedure to control, however, and cannot be employed satisfactorily in most instances where it is desired to maintain a differential coloring between the coated glass filaments and the cellulose. Furthermore, it is desirable that the resin be cured on the cellulose in an oven if the product is to be subsequently impregnated, or between the die drying dies, if it is to be die dried. On the other hand, the resin which coats the individual bundles of glass filaments is preferably cured while the latter are still in the aqueous slurry. Hence, if only a single addition of resin is made, it is difficult to maintain a differential curing between the bundles of glass filaments and the cellulose or other hydratable fiber.

Apart from their function in causing the second addition of resin to adhere to the cellulose or other hydratable fiber, substances which apparently change the electrical charge of the cellulose, such as alum and cationic substances, are useful in causing pigments and other coloring matters present in the aqueous slurry to adhere to the hydratable fiber, regardless of whether there is a second addition of resin. For example, when 10 parts of refined caroa fiber are opened in a beater for 10 minutes at 120° F., then mixed with 40 parts of ¾" Fiberglas cut rovings and 5 parts of a polyester resin containing a pigment dye (Selectron 5208 containing about 10% of Selectron 5554 blue paste), the colored resin normally adheres to the bundles of glass filaments. However, when 2% of alum is added to the aqueous slurry, the color tends to disperse throughout the fiber, making a more uniformly colored product. The cationic substances previously described function in a similar manner.

Novel and unusual decorative effects can be obtained by the practice of the invention because the non-hydratable bundles of glass filaments can be coated with a clear resin or the resinous coating can be colored white, blue, green, red, yellow or a variety of other colors. Similarly, the hydratable fiber can be present in the felted product with its natural appearance or in a colored state. Furthermore, if a final addition of colored resin-coated cut bundles of glass filaments is made to the aqueous slurry before felting, the colors used can be the same or different from those employed in coloring the bundles of glass filaments previously added and/or the hydratable fiber. One of our preferred procedures is to make three resin additions (1) to the bundles of glass filaments, either as a precoat or in the aqueous slurry, to prevent complete disintegration into individual filaments; (2) to the slurry as a binding agent; and (3) on glass filament bundles prepared in a separate batch. In this procedure we prefer to keep the same color in (1) and (2) and add the contrasting color as a colored resin coated fiber (3).

In the felted preforms and die dried products made therefrom, the hydratable fibers, such as cellulose, are intermingle with coated bundles of non-hydratable filaments, such as glass filaments, and the proportions of the hydratable and non-hydratable fibers can be varied within the previously described limits to produce varying effects.

In felted products which have subsequently been impregnated with a resin and molded between solid dies, additional novel decorative effects can be obtained due to the fact that the hydratable and non-hydratable fibers maintain substantially their original orientation but are now embedded in a body of resin which constitutes usually one-fifth to two times the weight of the total fibers. The impregnating resin can also be colored but more delicate and pleasing multicolored effects are usually obtained by employing a clear resin.

The term "hydratable fibers" refers to fibers that swell or hydrate in the presence of water and includes cellulose fibers and very fine glass fibers.

The term "fusible" is used herein to describe an uncured or incompletely cured resin (either solid or liquid) which has not been thermoset as distinguished from a cured resin which is infusible and does not soften or flow when heated. The term "fusible resins" as used herein also includes thermoplastic resins which are incapable of being cured to an infusible state.

Our copending applications Serial Nos. 189,040, filed October 7, 1950, now Patent No. 2,702,241, 267,018, filed January 17, 1952, now Patent No. 2,698,558, and 310,373, filed Sept. 18, 1952, are made a part hereof and the disclosures of said applications are incorporated herein by reference as fully as if they were set forth herein in their entireties.

The invention is hereby claimed as follows:

1. A process of making felted fibrous articles which comprises mixing hydratable and non-hydratable fibers in water to form an aqueous slurry, said non-hydratable fibers consisting essentially of cut thread-like bundles composed of a plurality of glass filaments, the bundles being coated individually with an adherent water insoluble coating material which does not adhere to the hydratable fibers, the quantity of said coating material being sufficient to prevent said bundles from disintegrating into individual filaments in said slurry, adding a water insoluble fusible resin to said slurry which attaches itself to said hydratable fibers and at the same time binds said hydratable fibers and coated non-hydratable filaments together, and thereafter felting said fibers from said slurry.

2. A process of making felted fibrous articles which comprises mixing cellulose fibers and non-hydratable fibers in water to form an aqueous slurry, said non-hydratable fibers consisting essentially of cut thread-like bundles of strands, each strand being composed of a plurality of glass filaments, the bundles being coated individually with an adherent water insoluble coating material which does not adhere to the cellulose fibers, the quantity of said coating material being sufficient to prevent said bundles from disintegrating into said filaments in said slurry, adding a water insoluble fusible resin to said slurry which attaches itself to said cellulose fibers and at the same time binds said cellulose fibers and coated non-hydratable filaments together, and thereafter felting said fibers from said slurry.

3. A process of making felted fibrous articles which comprises mixing hydratable and non-hydratable fibers in water to form an aqueous slurry, said non-hydratable fibers consisting essentially of cut thread-like bundles of strands, each strand being composed of a plurality of glass filaments, the bundles being coated individually with 5% to 25% by weight of an adherent water insoluble polyester coating material which does not adhere to the hydratable fibers, the weight ratio of said hydratable fibers to said non-hydratable fibers being within the range of 1:9 to 9:1, adding 1% to 25% by weight of the total fibers of a water insoluble fusible resin to said slurry which attaches itself to said hydratable fibers and at the same time binds said hydratable fibers and said polyester coated non-hydratable filaments together, and thereafter felting said fibers from said slurry.

4. A process of making felted fibrous articles which comprises mixing hydratable and non-hydratable fibers in water to form an aqueous slurry, said non-hydratable fibers consisting essentially of cut thread-like bundles of glass filaments, the bundles being coated individually with 5% to 25% by weight of an adherent water insoluble polyester coating material which does not adhere to the hydratable fibers, the quantity of said coating material being sufficient to prevent said bundles from disintegrating into individual filaments in said slurry, adding to said slurry a substance capable of causing the hydratable fibers in said slurry to adhere to a fusible polyester resin, adding a water insoluble fusible resin to said slurry which attaches itself to said hydratable fibers and at the same time binds said hydratable fibers and said coated non-hydratable filaments, and thereafter felting said fibers from said slurry.

5. A process of making felted fibrous articles which comprises mixing hydratable and non-hydratable fibers in water to form an aqueous slurry, said non-hydratable fibers consisting essentially of cut thread-like bundles of strands, each strand being composed of a plurality of glass filaments, the bundles being coated individually with 5% to 25% by weight of an adherent water insoluble infusible polyester coating material which does not adhere to the hydratable fibers, the quantity of said coating material being sufficient to prevent said bundles from disintegrating into individual filaments in said slurry, adding a cationic melamine formaldehyde resin to said slurry, adding to said slurry 1% to 25% of the total fibers of a water insoluble fusible polyester resin, and thereafter felting said fibers from said slurry.

6. A process of making felted fibrous articles which comprises dispersing hydratable fibers in water to form an aqueous slurry, adding to said slurry of dispersed hydratable fibers cut thread-like bundles of glass filaments surface coated with a substance which increases the adherence of polyester resins to said bundles of glass filaments, contemporaneously adding to said slurry a catalyzed fusible liquid polyester resin in sufficient amount to coat said bundles and prevent them from disintegrating into individual filaments in said slurry, converting said fusible resin to a substantially infusible state in said slurry, adding to said slurry a substance capable of producing adherence of polyester resins to said hydratable fibers, making a second addition of a catalyzed liquid water insoluble fusible polyester resin to said slurry which attaches itself to said hydratable fibers and at the same time binds them to said polyester coated bundles of glass filaments when an article is felted from said slurry and dried, and felting an article from said slurry.

7. A process of making felted fibrous articles which comprises dispersing hydratable fibers in water to form an aqueous slurry, adding to said slurry of dispersed hydratable fibers cut thread-like bundles of glass filaments surface coated with a substance which increases the adherence of polyester resins to said bundles of glass filaments, contemporaneously adding to said slurry a catalyzed fusible liquid polyester resin in sufficient amount to coat said bundles and prevent them from disintegrating into individual filaments in said slurry, converting said fusible resin to a substantially infusible state in said slurry, adding to said slurry a cationic substance capable of producing adherence of polyester resins to said hydratable fibers, adding a catalyzed liquid water insoluble fusible polyester resin to said slurry which attaches itself to said hydratable fibers and at the same time binds them to said polyester coated bundles of glass filaments when an article is felted from said slurry and dried, and felting an article from said slurry while said last added resin is in a fusible state.

8. A process of making felted fibrous articles which comprises dispersing a hydratable fiber in water to form an aqueous slurry, adding to said slurry of dispersed hydratable fibers cut thread-like bundles of glass filaments surface coated with a substance which increases the adherence of polyester resins to said bundles of glass filaments, contemporaneously adding to said slurry a catalyzed water insoluble fusible liquid thermosetting polyester resin in sufficient amount to coat said bundles and prevent them from completely disintegrating into individual filaments in said slurry, converting said fusible resin to a substantially infusible state in said slurry, thereafter adding to said slurry a water insoluble thermoplastic resin, felting an article from said slurry, and die drying said article.

9. A process as claimed in claim 8 in which the thermoplastic resin is polyvinyl acetate.

10. A process of making felted fibrous articles which comprises dispersing cellulose fibers in water to form an aqueous slurry, adding to said slurry cut thread-like bundles of glass filaments surface coated with a Werner complex and polyvinyl acetate, contemporaneously adding to said slurry a catalyzed water insoluble fusible liquid polyester resin consisting essentially of a polycarboxy acid-polyhydric alcohol condensation product dissolved in a liquid monomeric aryl compound having an unsaturated side chain, the quantity of said resin being within the range of 5% to 25% by weight of said bundles of glass filaments, converting said fusible resin to a substantially infusible state in said slurry, adding to said slurry a cationic melamine formaldehyde in sufficient amount to cause a liquid fusible polyester resin to deposit on said cellulose, adding to said slurry a liquid water insoluble fusible polyester resin in an amount within the range of about 1% to 25% by weight of the total fibers, said resin being a polycarboxy acid-polyhydric alcohol condensation product dissolved in a liquid monomeric aryl compound having an unsaturated side chain and being weakly catalyzed so that it is not converted to the infusible state in said slurry, and felting an article from said slurry.

11. A process as claimed in claim 10 in which the felted article is dried, impregnated with a resin and thereafter molded at superatmospheric pressures and temperatures.

12. A process of making felted fibrous articles which comprises dispersing cellulose in water to form an aqueous slurry, adding to said slurry cut thread-like bundles of glass filaments surface coated with a substance which increases the adherence of polyester resins to said bundles of glass filaments, contemporaneously adding to said slurry a catalyzed water insoluble fusible liquid polyester resin in sufficient amount to coat said bundles and prevent them from completely disintegrating into individual filaments in said slurry, converting said fusible resin to a substantially infusible state in said slurry, thereafter adding alum to said slurry, and felting an article from said slurry.

13. A process of making felted fibrous articles which comprises dispersing cellulose in water to form an aqueous slurry, adding to said slurry cut thread-like bundles of glass filaments surface coated with a substance which increases the adherence of polyester resins to said bundles of glass filaments, contemporaneously adding to said slurry a catalyzed water insoluble fusible liquid polyester resin in sufficient amount to coat said bundles and prevent them from completely disintegrating into individual filaments in said slurry, converting said fusible resin to a substantially infusible state in said slurry, thereafter adding a cationic substance to said slurry, and felting an article from said slurry.

14. A process of making felted decorative fibrous articles which comprises dispersing hydratable fibers in water to form an aqueous slurry, adding to said slurry of dispersed hydratable fibers cut thread-like bundles of glass filaments surface coated with a substance which increases the adherence of thermosetting resins to said bundles of glass filaments, adding to said slurry a catalyzed water insoluble fusible thermosetting resin in sufficient amount to coat said bundles and prevent them from disintegrating into individual filaments in said slurry, adding to said slurry a substance capable of producing adherence of resins to said hydratable fibers, adding to said slurry a water insoluble fusible resin of a different color from that of said first named resin which attaches itself to said treated hydratable fibers and at the same time binds said hydratable fibers and said coated bundles of glass filaments together, and felting an article from said slurry.

15. A process of making decorative fibrous articles which comprises mixing hydratable and non-hydratable fibers in water to form an aqueous slurry, said non-hydratable fibers consisting essentially of cut thread-like bundles composed of a plurality of glass filaments, the bundles being coated individually with an adherent water insoluble coating material which is colored and the quantity of said coating material being sufficient to prevent said bundles from disintegrating into individual filaments in said slurry, adding to said slurry a substance capable of producing adherence of resins to said hydratable fibers, adding to said slurry a water insoluble resin of substantially the same color as the color of the coated thread-like glass filament bundles, which attaches itself to the resultant treated hydratable fibers and at the same time binds said hydratable fibers and said coated non-hydratable fibers together, adding to said slurry a separately prepared slurry of cut thread-like bundles of glass filaments in which said bundles are individually coated with a resin of a contrasting color, and felting an article from the resultant slurry.

16. A process of making felted decorative fibrous articles which comprises dispersing hydratable fibers in water to form an aqueous slurry, adding to said slurry of dispersed hydratable fibers cut thread-like bundles of glass filaments surface coated with a substance which increases the adherence of polyester resins to said bundles of glass filaments, contemporaneously adding to said slurry a catalyzed fusible thermosetting liquid water insoluble polyester resin in sufficient amount to coat said bundles and prevent them from disintegrating into individual filaments in said slurry, converting said fusible resin to a substantially infusible state in said slurry, thereafter adding to said slurry a cationic melamine formaldehyde capable of producing adherence of polyester resins to said hydratable fibers, adding to said slurry a catalyzed liquid fusible water insoluble polyester resin of a color different from that of said first named resin which attaches itself to said hydratable fibers and at the same time binds said hydratable fibers and said coated bundles of glass filaments together, and felting an article from said slurry.

17. A process of making felted fibrous articles which comprises mixing hydratable and non-hydratable fibers in water to form an aqueous slurry, said non-hydratable fibers consisting essentially of cut thread-like bundles of strands, each strand being composed of a plurality of glass filaments, said bundles being coated with a substance which increases the adherence of water insoluble polyester resins to said bundles of glass filaments, the weight ratio of said hydratable fibers to said non-hydratable fibers being within the range of 5:95 to 95:5, dispersing with said mixture a liquid fusible water insoluble polyester resin, a substance capable of producing adherence of polyester resins to said hydratable fibers, and a water insoluble thermoplastic resin, the quantity of said liquid polyester resin being within the range from about 5% to 25% by weight of said bundles of glass filaments, and the quantity of said thermoplastic resin being within the range of about 1% to 25% by weight of the total fibers, and felting said fibers into an article from said slurry.

18. A process as claimed in claim 17 in which said hydratable fibers consists principally of cellulose, said bundles of glass filaments are cut into lengths averaging ⅛ inch to 8 inches long, said glass filaments are surface coated with a Werner complex and polyvinyl acetate in sufficient amount to increase their adherence for the polyester resin, said liquid polyester resin consists essentially of a polycarboxy acid-polyhydric alcohol condensation product dissolved in a liquid monomeric aryl compound having an unsaturated side chain and contains an oxygen supplying catalyst, said substance capable of producing adherence of polyester resins to hydratable fibers being from the group consisting of alum, cationic melamine-formaldehyde resins and quaternary ammonium salts containing a long aliphatic hydrocarbon chain, and said thermoplastic resin being from the group consisting of polyvinyl acetate, polymethylacrylate, polyethylacrylate, polymethylmethacrylate and polyethylmethacrylate resins.

19. A process of making felted fibrous articles which comprises mixing hydratable and non-hydratable fibers in water to form an aqueous slurry, said non-hydratable fibers consisting essentially of cut thread-like bundles of strands, each strand being composed of a plurality of glass filaments, said bundles being coated with a substance which increases the adherence of water insoluble polyester resins to said bundles of glass filaments, the weight ratio of said hydratable fibers to said non-hydratable fibers being within the range of 5:95 to 95:5, dispersing with said mixture a liquid fusible water insoluble polyester resin, a substance capable of producing adherence of polyester resins to said hydratable fibers, and a water insoluble thermoplastic resin, the quantity of said liquid polyester resin being within the range of about 5% to 25% by weight of said bundles of glass filaments, and the quantity of said thermoplastic resin being within the range of about 1% to 25% by weight of the total fibers, converting said fusible polyester resin to an infusible state in said slurry, and felting said fibers into an article from said slurry.

20. A process of making felted fibrous articles which comprises mixing hydratable and non-hydratable fibers in water to form an aqueous slurry, said non-hydratable fibers consisting essentially of cut thread-like bundles of strands, each strand being composed of a plurality of glass filaments, said bundles being coated with a substance which increases the adherence of water insoluble polyester resins to said bundles of glass filaments, the weight ratio of said hydratable fibers to said non-hydratable fibers being within the range of 5:95 to 95:5, dispersing with said mixture a liquid fusible water insoluble polyester resin, a substance capable of producing adherence of polyester resins to said hydratable fibers, and a water insoluble thermoplastic resin, the quantity of said liquid polyester resin being within the range of about 5% to 25% by weight of said bundles of glass filaments, and the quantity of said thermoplastic resin being within the range of about 1% to 25% by weight of the total fibers, felting said fibers into an article from said slurry, and converting at least a part of said fusible polyester resin to its infusible form by die drying.

21. A process of making fibrous felted articles which comprises mixing hydratable and non-hydratable fibers in water to form an aqueous slurry, said non-hydratable fibers consisting essentially of cut thread-like bundles of strands, each strand being composed of a plurality of glass filaments, said bundles being coated with a substance which increases the adherence of water insoluble polyester resins to said bundles of glass filaments, the weight ratio of said hydratable fibers to said non-hydratable fibers being within the range of 5:95 to 95:5, dispersing with said mixture a liquid fusible water insoluble polyester resin which is capable of being converted to an infusible state, also adding to said mixture a substance capable of producing adherence of polyester resins to said hydratable fibers, said last named substance being from the group consisting of alum, cationic melamine-formaldehyde resins and quaternary ammonium salts containing a long aliphatic hydrocarbon chain, making a second addition of a water insoluble resin to said mixture, said second addition resin being from the group consisting of liquid fusible water insoluble polyester resins and thermoplastic resins, the quantity of said first liquid polyester resin being within the range from about 5% to 25% by weight of said bundles of glass filaments, and the quantity of said second addition resin being within the range of about 1% to 25% by weight of the total fibers, converting at least part of the fusible polyester resins to an infusible state in said mixture, and felting the resulting fibers into an article from said slurry.

References Cited in the file of this patent

UNITED STATES PATENTS

| | | |
|---|---|---|
| 1,829,585 | Dreyfus | Oct. 27, 1931 |
| 1,998,781 | Jackson | Apr. 23, 1935 |
| 2,264,189 | Richter et al. | Nov. 25, 1941 |
| 2,345,543 | Wohnsiedler et al. | Jan. 4, 1943 |
| 2,354,110 | Ford | July 18, 1944 |
| 2,477,555 | Roberts et al. | July 26, 1949 |
| 2,504,744 | Sproull et al. | Apr. 18, 1950 |
| 2,526,125 | Francis | Oct. 17, 1950 |
| 2,563,289 | Steinman | Aug. 1, 1951 |
| 2,582,840 | Maxwell | Jan. 15, 1952 |
| 2,611,718 | Steinman | Sept. 23, 1952 |
| 2,633,433 | Hollenberg | Mar. 31, 1953 |
| 2,653,090 | Crandall | Sept. 22, 1953 |
| 2,692,219 | Slayter | Oct. 19, 1954 |
| 2,694,630 | Landes et al. | Nov. 16, 1954 |
| 2,698,558 | Hawley et al. | Jan. 4, 1955 |
| 2,699,389 | Crandall | Jan. 11, 1955 |
| 2,702,241 | Hawley et al. | Feb. 15, 1955 |

FOREIGN PATENTS

| | | |
|---|---|---|
| 497,059 | Great Britain | Dec. 8, 1938 |
| 672,122 | Great Britain | May 14, 1952 |
| 790,255 | Great Britain | Feb. 5, 1958 |

OTHER REFERENCES

Callinan et al.: Electrical Properties of Glass-Fiber Paper, pp. 5–9, pub. by Naval Research Lab., Washington, D.C. (May 1951).

UNITED STATES PATENT OFFICE
CERTIFICATE OF CORRECTION

Patent No. 2,932,601

April 12, 1960

Don M. Hawley et al.

It is hereby certified that error appears in the printed specification of the above numbered patent requiring correction and that the said Letters Patent should read as corrected below.

Column 5, line 29, for "died" read -- die --; column 7, line 30, for "perform" read -- preform --.

Signed and sealed this 22nd day of November 1960.

(SEAL)
Attest:

KARL H. AXLINE
Attesting Officer

ROBERT C. WATSON
Commissioner of Patents